United States Patent
Hanchett, Jr.

(10) Patent No.: US 8,659,176 B2
(45) Date of Patent: Feb. 25, 2014

(54) ELECTROMAGNETIC ENERGY HARVESTER AND A DOOR LATCH RELEASE MECHANISM AS AN ENERGY SOURCE FOR THE HARVESTER

(75) Inventor: Leland J. Hanchett, Jr., Cave Creek, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 412 days.

(21) Appl. No.: 13/087,532

(22) Filed: Apr. 15, 2011

(65) Prior Publication Data
US 2011/0254285 A1    Oct. 20, 2011

Related U.S. Application Data

(60) Provisional application No. 61/324,696, filed on Apr. 15, 2010.

(51) Int. Cl.
| | |
|---|---|
| F02B 63/04 | (2006.01) |
| F03G 7/08 | (2006.01) |
| H02K 7/18 | (2006.01) |
| H02K 41/00 | (2006.01) |

(52) U.S. Cl.
USPC ............................. 290/1 R; 310/14

(58) Field of Classification Search
USPC ........................... 290/1 R; 310/14
See application file for complete search history.

(56) References Cited

U.S. PATENT DOCUMENTS

| | | | | |
|---|---|---|---|---|
| 3,733,456 A | * | 5/1973 | Blackburn | 219/724 |
| 4,146,831 A | * | 3/1979 | Farr | 322/94 |
| 4,321,445 A | * | 3/1982 | Kristof et al. | 219/724 |
| 4,433,355 A | * | 2/1984 | Chew et al. | 361/172 |
| 4,827,163 A | * | 5/1989 | Bhate et al. | 310/15 |
| 4,853,630 A | * | 8/1989 | Houston | 324/207.13 |
| 4,928,028 A | * | 5/1990 | Leibovich | 310/23 |
| 5,168,221 A | * | 12/1992 | Houston | 324/207.13 |
| 5,495,376 A | * | 2/1996 | Wasson et al. | 360/75 |
| 5,497,641 A | * | 3/1996 | Linde et al. | 70/257 |
| 6,002,184 A | * | 12/1999 | Delson et al. | 310/14 |
| 6,147,422 A | * | 11/2000 | Delson et al. | 310/14 |
| 6,307,285 B1 | * | 10/2001 | Delson et al. | 310/14 |
| 6,700,248 B2 | * | 3/2004 | Long | 310/80 |
| 6,700,259 B1 | * | 3/2004 | Lin et al. | 310/90.5 |
| 6,707,184 B2 | * | 3/2004 | Kusase | 310/68 B |
| 6,936,937 B2 | * | 8/2005 | Tu et al. | 310/12.12 |
| 7,309,934 B2 | * | 12/2007 | Tu et al. | 310/12.12 |
| 7,446,440 B2 | * | 11/2008 | Mihajlovic | 310/28 |
| 7,538,980 B2 | * | 5/2009 | Harper et al. | 360/261.1 |
| 7,554,303 B1 | * | 6/2009 | Kawamura | 322/46 |
| 7,573,163 B2 | * | 8/2009 | Tu et al. | 310/12.21 |

(Continued)

*Primary Examiner* — Pedro J Cuevas
(74) *Attorney, Agent, or Firm* — Woods Oviatt Gilman LLP

(57) ABSTRACT

A system for electromagnetically harvesting waste kinetic energy. A wound electrical coil having a hollow bobbin abuts an opening in ring magnet. An actuator plunger extends through the opening. Fixed magnets are located at the opposite end of the bobbin. Floating magnets are disposed within the bobbin, arranged with their magnetic field opposing that of the fixed magnets but not that of the ring magnet. Axial force on the actuator plunger moves the floating magnets toward the fixed magnets. When the actuator is released, the floating magnets are repelled by the fixed magnets and attracted by the ring magnet, causing the floating magnets to pass rapidly through the coil, thereby generating an electric current in the coil. In one application, the harvester is actuated by a keeper in a door latch release mechanism. In a second application the harvester is actuated by a latch bolt of a lock set.

22 Claims, 8 Drawing Sheets

(56) References Cited

U.S. PATENT DOCUMENTS

| | | | |
|---|---|---|---|
| 7,605,482 B2 | 10/2009 | Brown et al. | 290/1 R |
| 7,764,268 B2* | 7/2010 | Gomez et al. | 345/156 |
| 7,952,238 B2* | 5/2011 | Tu et al. | 310/12.24 |
| 7,952,477 B2* | 5/2011 | Fogg | 340/542 |
| 8,002,089 B2* | 8/2011 | Jasso et al. | 188/83 |
| 8,013,847 B2* | 9/2011 | Anastas | 345/184 |
| 8,018,434 B2* | 9/2011 | Gomez et al. | 345/157 |
| 8,276,415 B2* | 10/2012 | Trempala et al. | 70/283.1 |
| 8,347,674 B2* | 1/2013 | Trempala et al. | 70/283.1 |
| 8,446,241 B2* | 5/2013 | Filiputti et al. | 335/185 |
| 8,525,453 B2* | 9/2013 | Ogawa | 318/368 |
| 2002/0047353 A1* | 4/2002 | Kusase | 310/68 B |
| 2002/0097013 A1* | 7/2002 | Bedini | 318/139 |
| 2003/0034697 A1* | 2/2003 | Goldner et al. | 310/17 |
| 2006/0244332 A1* | 11/2006 | Wyremba | 310/179 |
| 2007/0273156 A1* | 11/2007 | Miyajima et al. | 290/53 |
| 2010/0089739 A1* | 4/2010 | Filiputti et al. | 200/82 R |
| 2010/0154495 A1* | 6/2010 | Fogg | 70/279.1 |

* cited by examiner

ELECTROMAGNETIC ENERGY HARVESTER AND A DOOR LATCH RELEASE MECHANISM AS AN ENERGY SOURCE FOR THE HARVESTER

CROSS-REFERENCE TO RELATED APPLICATIONS

This application claims the benefit of U.S. Patent Application No. 61/324,696, filed Apr. 15, 2010. U.S. Patent Application No. 61/324,696 is hereby incorporated by reference in its entirety.

TECHNICAL FIELD

The present invention relates to an energy harvesting apparatus ("energy harvesters"); and, more particularly, to energy harvesters wherein energy generation and harvesting requires the motion of one or more magnets ("electromagnetic energy harvester" or "EMEH"). In one application, a door latch release mechanism is used as a source of the harvested energy.

BACKGROUND OF THE INVENTION

"Energy harvesters" and "energy harvesting" refer generally to apparatus and methods for collecting and storing energy present in the environment, such as solar energy, RF energy, and kinetic energy such as low frequency excitation or rotation. Such energies are referred to herein as "waste" energies. Storing is typically in the form of conversion of waste energy to electricity and subsequent storage in a battery.

U.S. Pat. No. 7,605,482 B2 discloses an EMEH including a reciprocating energy collector that passes a magnet through a coil of wire thereby "collecting" electrical energy from the reciprocating motion. A spring is used to store energy during the down-stroke of the reciprocating collector and to release its stored energy to return the collector to its at-rest position. A holder is used to momentarily trap the collector in its downstroke so that the spring may return the collector to its at-rest position at a greater upstroke speed than the downstroke speed of the collector. Thus, in the EMEH disclosed in U.S. Pat. No. 7,605,482 B2, an energy storage device such as a spring is needed as well as a means for trapping the collector before release of the stored energy to maximize the speed of the collector in its upstroke, once the means for trapping is released.

What is needed in the art is an improved and simplified EMEH wherein a mechanical holder or a spring for storing energy is not required.

What is further needed in the art is a door latch release mechanism including the improved and simplified EMEH to electromagnetically harvest "waste" kinetic energy from the door latch actuating mechanism.

It is a principal object of the present invention to provide an improved EMEH.

It is a further object of the present invention to include the improved EMEH in a door latch release mechanism.

SUMMARY OF THE INVENTION

Briefly described, a system for electromagnetically harvesting kinetic energy in accordance with the present invention is based on the principle of moving a magnetic field rapidly through the center of a wire coil.

A wound electrical coil comprises a hollow bobbin with wire coiled around it. The bobbin abuts a ferromagnetic plate or a ring magnet having an opening slightly smaller than the bore of the hollow bobbin. A slidable actuator includes a plunger extending through the opening in the plate/ring magnet at a first end of the bobbin. Fixed magnets are located at the opposite end of the bobbin. Floating magnets are disposed within the bobbin bore arranged with field opposing that of the fixed magnets. At rest, the floating magnets are attracted to the ferromagnetic plate or to a neutral position just off the surface of the ring magnet. Axial force on the actuator plunger moves the floating magnets toward the fixed magnets with increasing resistance since the polar relationships between the floating and fixed magnets are opposing. In one embodiment, when the actuator is released, the floating magnets are repelled by the fixed magnets and attracted by the ferromagnetic plate, causing the floating magnets to pass rapidly through the coil, thereby generating an electric current in the coil. When a ring magnet is used instead of a ferromagnetic plate, the floating magnets' polar attraction to the ring magnet causes the floating magnets to pass through the coil even faster generating even more current. The use of the ring magnet in place of the ferromagnetic plate also provides a convenient braking feature as the pole of the floating magnets approaches the pole of the ring magnet. At that point, the direction of attraction force on the floating magnets quickly changes from axial to radial and, since the floating magnets are contained radially within the coil bobbin, the floating magnets are stopped just short of contact with the ring magnet. Thus, physical contact between the two is avoided. In that close-to-contact region, the floating magnets oscillate axially for a short period providing more capturable energy. The electric current may be used directly or may be rectified and stored in a battery for future use.

Such an EMEH may be used to harvest energy from the motion of at least one of a plurality of components in a door latch actuating mechanism that, in motion, define sources of waste kinetic energy, any one of which may be harnessed in accordance with the present invention. In one embodiment described below, the kinetic energy of a keeper in a strike mechanism is harnessed as the strike is opened to release a latch or dead bolt and as the keeper returns rapidly to its locked position. Another application harvests the motion of a latch bolt as it is retracted into a door by a knob or handle and as the latch bolt returns rapidly to its extended position.

Further, in many other applications waste kinetic energy from reciprocal motion may be electromagnetically harvested in accordance with the present invention.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

Figure 1:
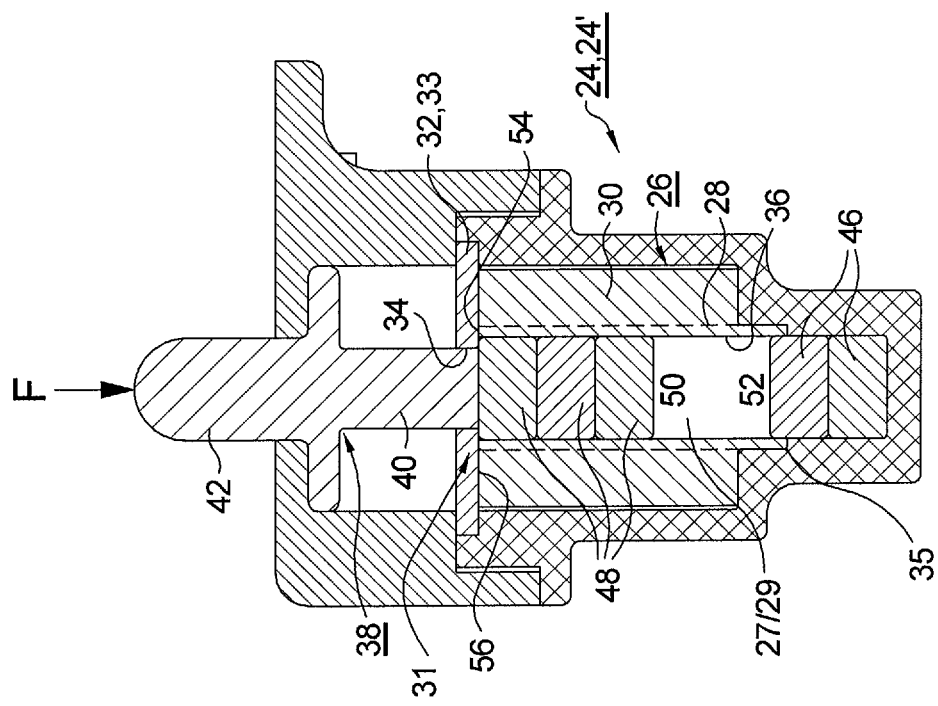
FIG. 1 is a cross-sectional view of an EMEH, in accordance with the invention, the actuator of the EMEH being in its at-rest position.

Referring to FIG. 1, an exemplary electromagnetic energy harvester (EMEH) 24,24' for harvesting kinetic energy in accordance with the invention, is shown. The operation of EMEH 24,24' is based on the principle of moving a magnetic field rapidly through the center of a wire coil.

EMEH 24,24' comprises a wound electrical coil or coils 26 including a hollow bobbin 28 with wire 30 coiled around it. Central portion 27 of wire wound coil 26 within bobbin 28 defines an energy converter chamber 29. At one end 31 of coil 26, bobbin 28 abuts a plate 32 having an opening 34 slightly smaller than the bore 36 of hollow bobbin 28. Plate 32 may be formed of a ferromagnetic material or, in one aspect of the invention (EMEH 24'), may itself be a fixed-in-place ring magnet 33 with a specific polar orientation. Ring magnet 33 may be formed, for example, of neodymium because of its relatively high coercivity, available from K&J Magnetics, Inc. of Jamison, Pa., USA. A slidable actuator 38 is disposed adjacent plate/ring magnet 32/33 and includes a non-magnetic plunger 40 extending through opening 34 in plate/ring magnet 32/33. A force F applied to head 42 of actuator 38 causes actuator 38 to move in the direction shown by the arrow. One or more fixed permanent magnets 46 (two shown in FIG. 1) are located at end 35 of coil 26 opposite end 31. One or more floating permanent magnets 48 (three shown in FIG. 1) are slidably disposed within converter chamber 29, and are arranged such that net field pole 50 of floating magnets 48 is repelled by net field pole 52 of fixed magnets 46 (e.g., magnetic orientations of net field pole 50 relative to net pole 52 are north-north or south-south). In the case where ring magnet 33 is used in place of plate 32, in a preferred polar orientation, the net field pole 56 of ring magnet 33 and the net field pole 54 of floating magnets 48 are oriented such that poles 54,56 attract each other (e.g., magnetic orientations of net field pole 56 relative to net pole 54 are north-south or south-north).

Figure 2:
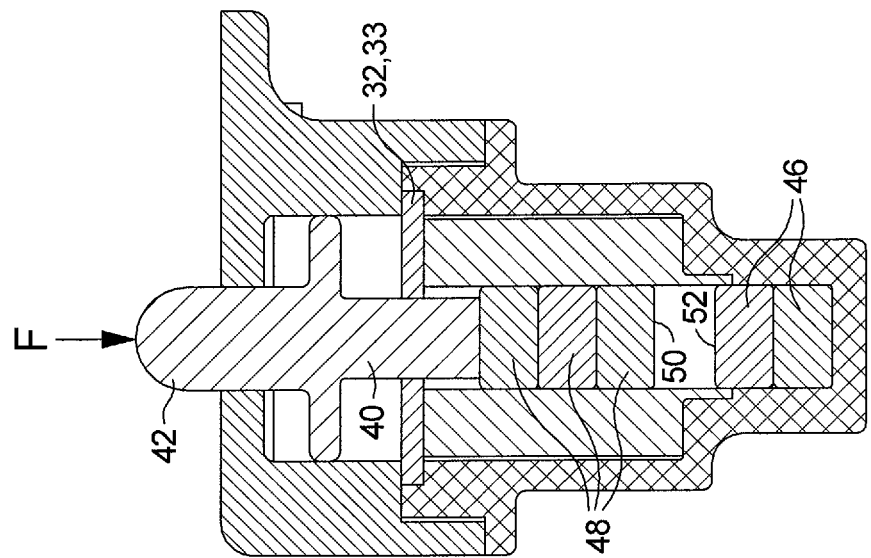
FIGS. 2-4 are cross-sectional views of the EMEH, in accordance with the invention, with the actuator shown in several positions during its stroke.
Figure 4:
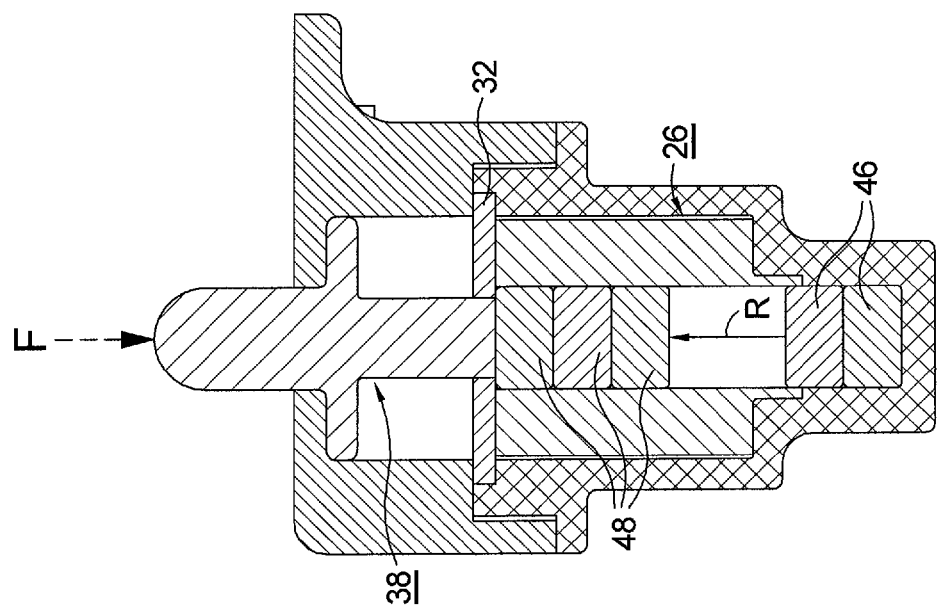
Figure 3:
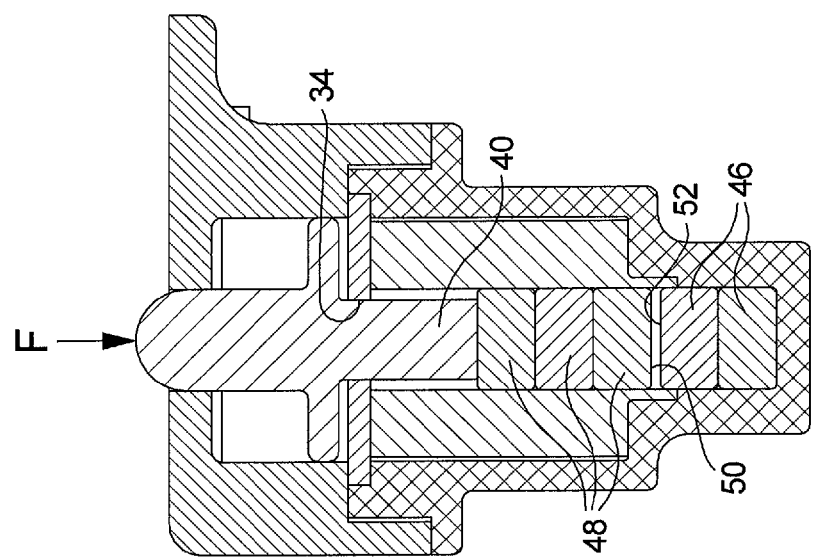
Figure 5:
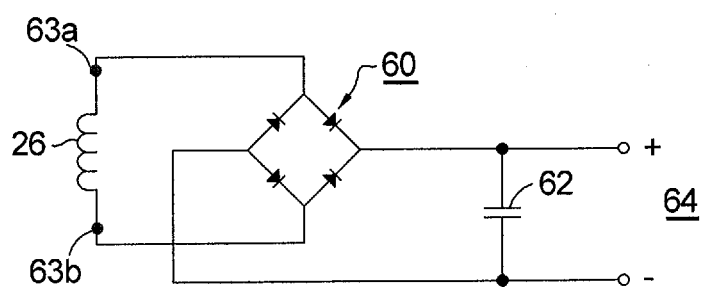
FIG. 5 is a schematic wiring diagram for rectifying and storing electric current generated by an EMEH in accordance with the invention.

In operation of EMEH 24, at rest as shown in FIG. 1, wherein plate 32 is formed of a ferromagnetic material, floating magnets 48 are attracted to ferromagnetic plate 32, thereby positioning actuator 38 in its uppermost position as shown in FIG. 1. Referring to FIG. 2, as force F is applied to head 42 and plunger 40, plunger 40 separates floating magnets 48 from ferromagnetic plate 32 and drives them toward fixed magnets 46 with increasing resistance since poles 50,52 are like-poles. Referring now to FIG. 3, actuator plunger 40 is fully depressed through opening 34 and floating magnets 48 are driven nearly into contact with fixed magnets 46, creating a powerful magnetic repulsion force R (FIG. 4) between like-poles 50,52. Referring to FIG. 4, when force F is quickly removed from actuator 38, floating magnets 48 are repelled by fixed magnets 46, by repulsion force R, and are attracted by ferromagnetic plate 32, causing floating magnets 48 to pass rapidly through coil 26, thereby generating an electric current in coil 26 that may be used directly or stored in a battery (not shown) for future use. When the floating magnets 48 reach and are stopped by ferromagnetic plate 32, voltage output is discontinued. Although voltage output is a function of the speed at which the magnets travel through the coil, some voltage is generated in both travel directions of magnets 48. These oppositely polarized voltage signals can be rectified and stored as shown in FIG. 5, wherein electric current from coil 26 is passed via first and second coil lead ends 63a,63b through a bridge rectifier 60 and capacitor 62 and thence to storage or use 64.

Note that, in the at rest position of EMEH 24 (FIG. 1), because of the magnetic attraction between floating magnets 48 and ferromagnetic plate 32, an initial force F applied to head 42 that is needed to break floating magnets 48 free from plate 32 is relatively high. This phenomenon is remedied in EMEH 24' by the use of ring magnet 33 in place of ferromagnetic plate 32 wherein the net field pole 56 of ring magnet 33 facing floating magnets 48 is oriented opposite the net filed pole 54 of floating magnets 48 facing ring magnet 33. In such a polar orientation, floating magnets 48 are magnetically attracted to ring magnet 33 until floating magnets 48 come in a close, but not touching relationship with ring magnet 33. At that point, since both the ring magnet 33 and the floating magnets 48 are held in axial alignment with each other, the lines of force of the magnets keep floating magnets 48 from being pulled axially toward ring magnet 33 and thus opposing magnets 33 and 48 stop short of making contact with each other.

Figure 6:
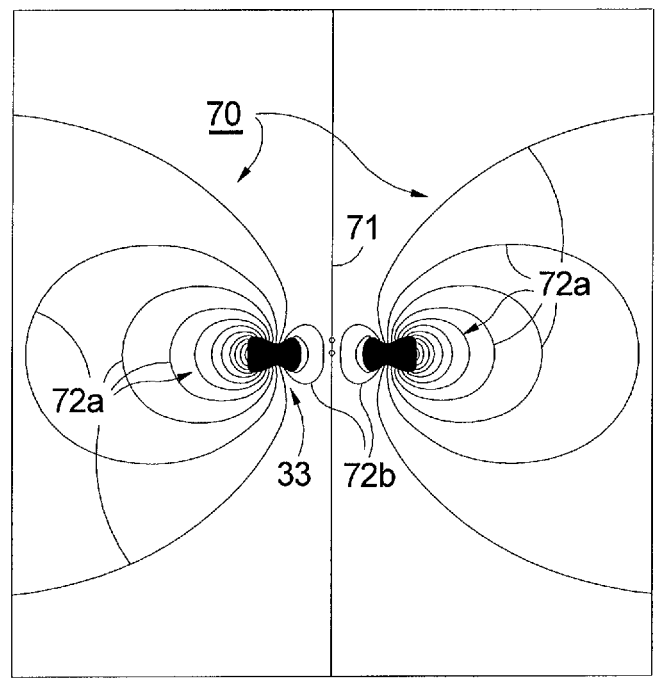
FIG. 6 is a magnetic field visualization of a ring magnet in free space.

Referring to FIG. 6, while not tying patentability of the invention to the explanation, the switching point where floating magnets 48 cease to be pulled axially toward ring magnet 33 might be explained. FIG. 6 depicts the magnetic field 70 of a sectioned ring magnet 33 in free space relative to the magnet's axis 71. Each of field lines 72a from one pole can be seen to loop around the outside of ring magnet 33 around to the other pole. At some point closer to the center opening of the ring magnet however, the general paths of the field lines 72b switch and loop through the center of the magnet. It is believed that, when the lines of force of floating magnets 48 pass through field lines 72a of ring magnet 33, the axial force directed along axis 71 pulling floating magnets 48 toward ring magnet 33 increases, the closer floating magnets 48 get to ring magnet 33. However, when the lines of force of floating magnets 48 come upon field lines 72b of ring magnet 33, the radial forces applied to floating magnets 48 become greater than the pull of the axial force thereby providing a net force that tends to prevent floating magnets 48 from coming in contact with ring magnet 33.

Thus, the use of ring magnet 33 in place of ferromagnetic ring 32 offers several advantages including:

a) increased acceleration of floating magnets 48 as they are pulled by ring magnet 33 away from fixed magnets 46;

b) providing a braking affect on the floating magnets 48 as they approach ring magnet 33 to minimize the impact force of the floating magnets striking the ring magnet;

c) causing floating magnets to oscillate axially, influenced by the braking affect described in b) thereby generating addition current through the oscillations; and d) providing an air gap between floating magnets 48 and ring magnet 33, when at rest, thereby substantially decreasing force (F) needed on plunger 40 to start to move floating magnets 48 toward fixed magnets 46.

Figure 7:
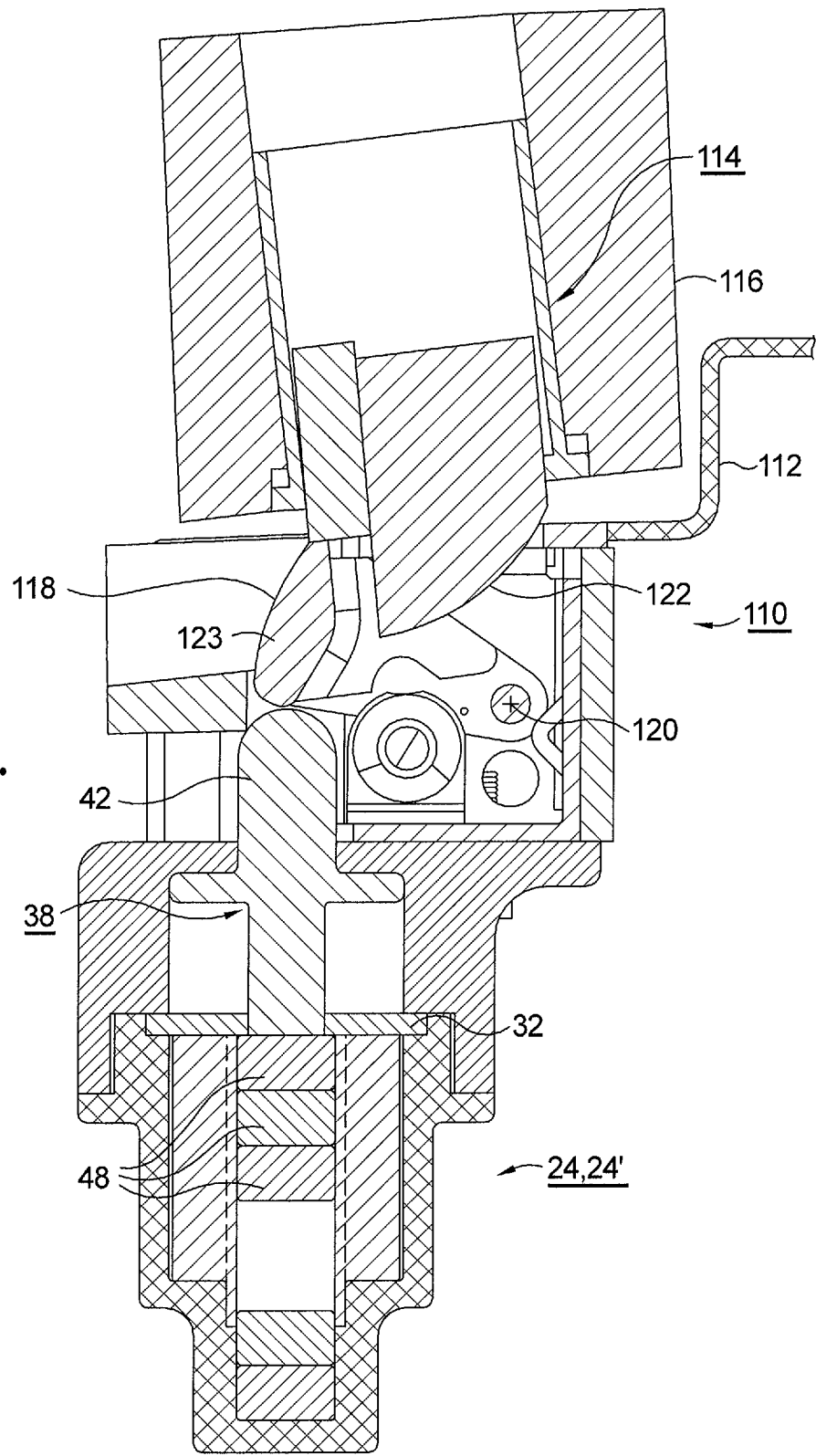
FIG. 7 is a cross-sectional view of a door latch release mechanism mounted in a frame of a door and including an EMEH in accordance with the present invention, the door bolt being held in a locked state by a keeper.

Referring now to FIG. 7, one useful and practical application of EMEH 24,24' is for the harvesting of energy from the motion of a door latch actuating mechanism such as an electric door strike. First exemplary strike 110 is mounted in a door frame 112 for cooperating with a door latch assembly 114 mounted in a door 116 hinged to frame 112. Strike 110 includes a plurality of components that, in motion, define sources of waste kinetic energy which may be harnessed in accordance with the present invention. In the embodiment shown, keeper 118 is pivotably disposed for rotation about a pivot axis 120 when permitted to do so, in accordance with the prior art in strikes. When keeper 118 is prohibited from rotation, retractable bolt 122 of door latch assembly 114 is captured within strike 110, locking door 116 in frame 112. When keeper 118 is permitted to rotate, bolt 122 may pass keeper 118 as described in greater detail below, thereby opening door 116. As will be discussed in more detail below, the energy produced by the forced rotation of keeper 118 can be harvested by EMEH 24.

Figure 8:
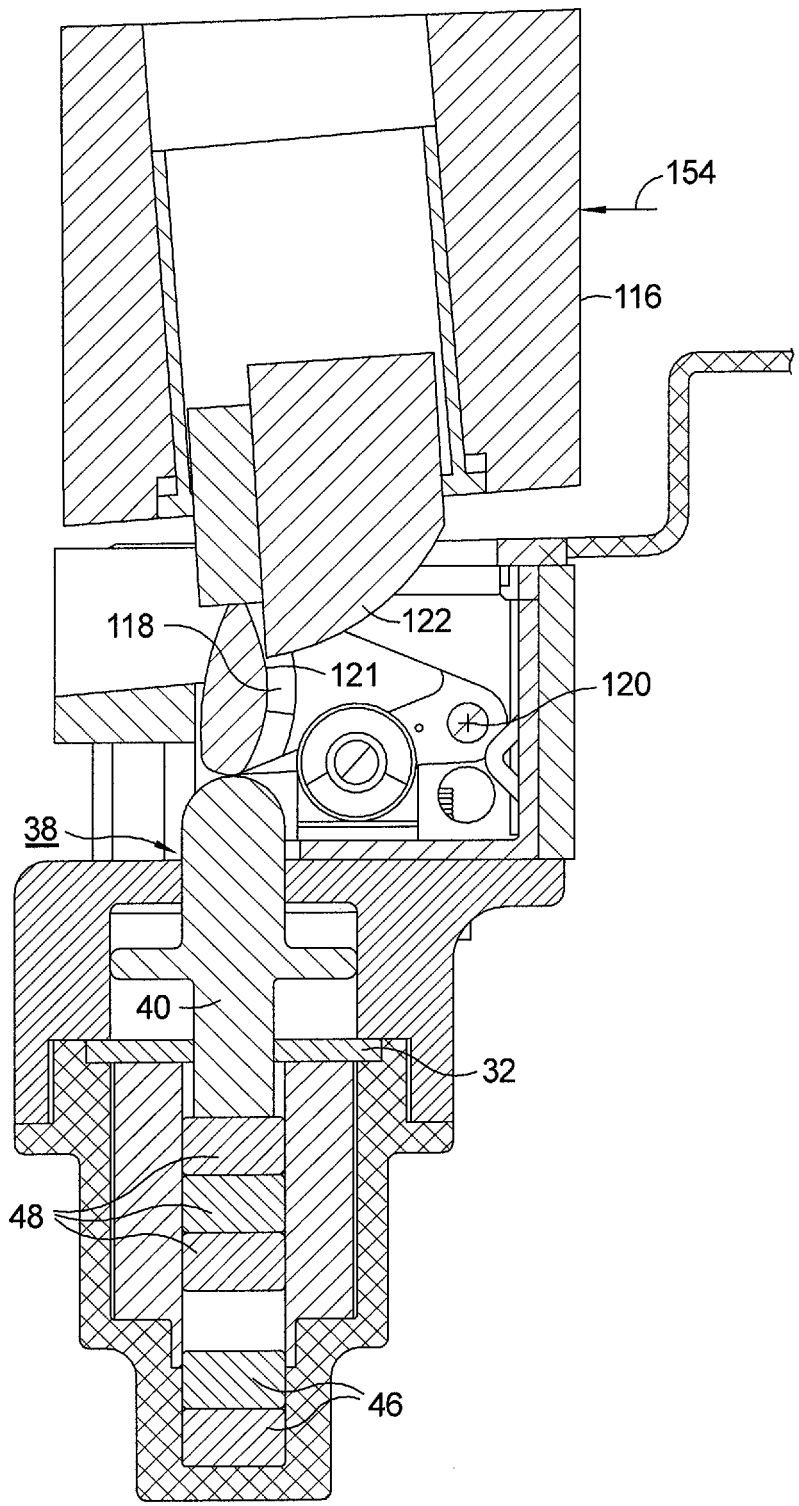
FIG. 8 is a view like that shown in FIG. 7, showing an early stage of the door latch release mechanism being unlocked, the keeper beginning actuation of the EMEH.
Figure 9:
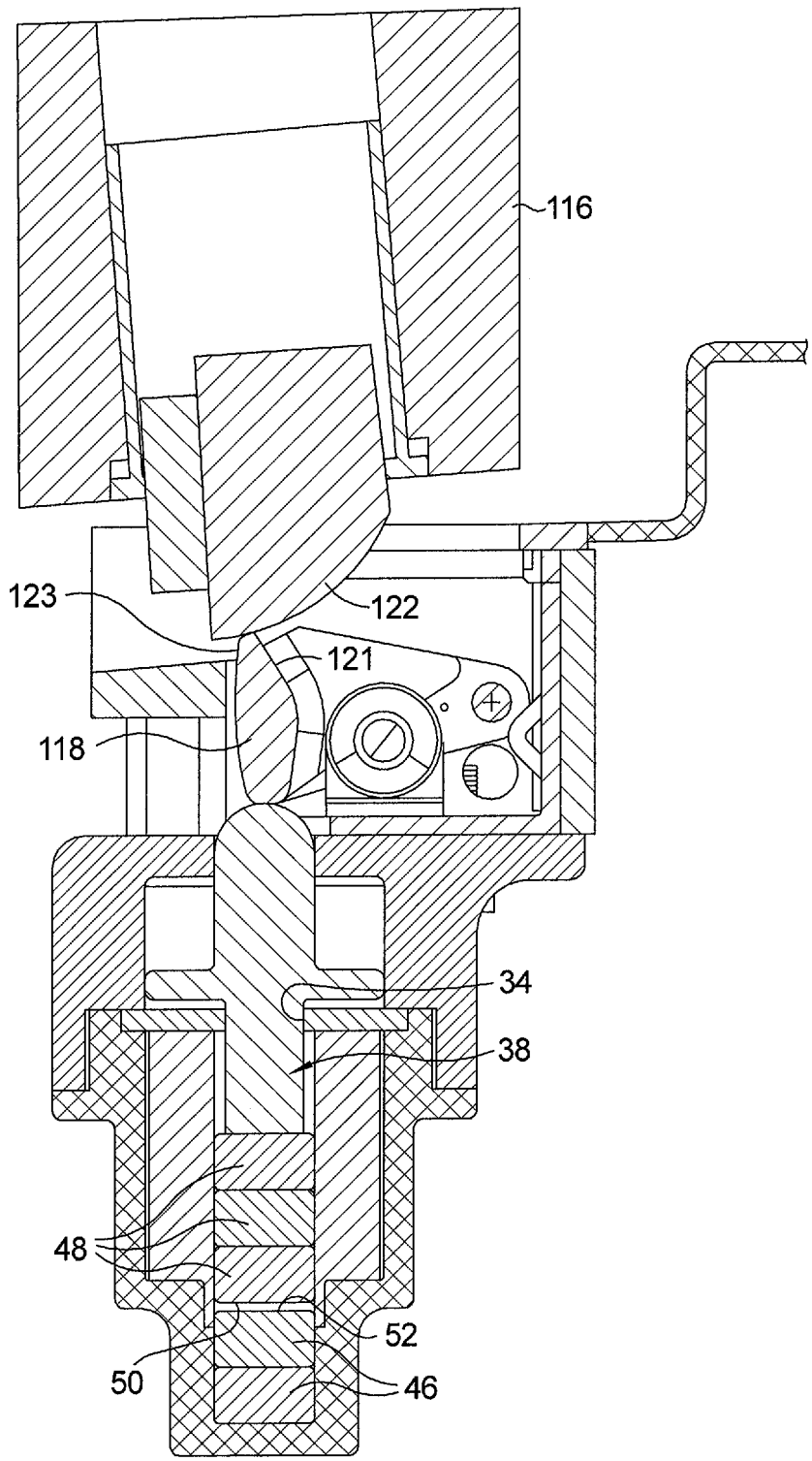
FIG. 9 is a view like that shown in FIG. 8, showing a later stage of the door latch release mechanism being unlocked, the keeper completing actuation of the EMEH.
Figure 10:
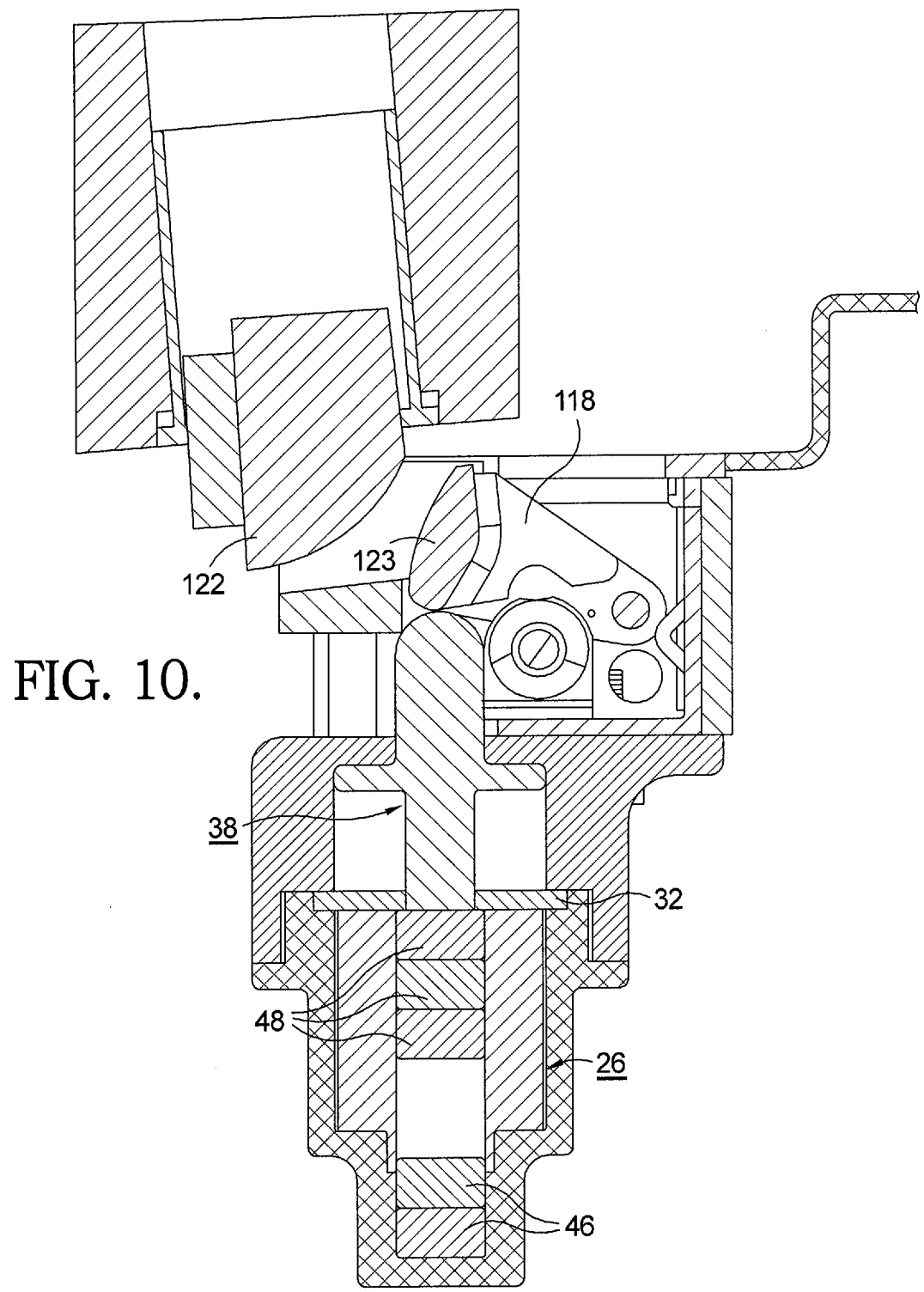
FIG. 10 is a view like that shown in FIG. 9, showing the door opened and the floating magnets of the EMEH returned to the starting position shown in FIG. 7.

EMEH 24,24' is operationally connected to strike 110 for harvesting energy from the actuation of the strike, as shown in FIG. 7. The motion of keeper 118 provides axial force F on actuator 38 as shown in FIGS. 1-4. As shown in FIG. 7, head 42 of actuator 38 engages cam portion 123 of keeper 118, keeper 118 is in its at-rest position, actuator 38 is in its uppermost position and floating magnets 48 are attracted to ferromagnetic plate/ring magnet 32/33. Referring to FIG. 8, when keeper 118 is unlocked from its at-rest position and permitted to rotate counterclockwise about pivot axis 120 in response to an opening force 154 exerted on door 116, bolt 122 applies a force on face 121 of keeper 118, an axial force is applied to actuator 38 by keeper 118 and plunger 40 separates floating magnets 48 from ferromagnetic plate 32 or moves floating magnets 48 away from ring magnet 33, moving the floating magnets toward fixed magnets 46. Referring now to FIG. 9, upon further opening motion of door 116, bolt 122 climbs face 121 of keeper 118 and eventually reaches and then clears the end of cam portion 123. At this point, floating magnets 48 are driven by actuator 38 to be nearly in contact with fixed magnets 46, bringing like field poles 50,52 close to each other. Referring finally to FIG. 10, when bolt 122 clears cam portion 123, keeper 118 is rotated quickly clockwise toward its at-rest position, under the force of a keeper return spring (not shown), to the position shown in FIGS. 7 and 10, and actuator 38 is released. Floating magnets 48 are repelled by fixed magnets 46 and are attracted by ferromagnetic plate/ring magnet 32/33, causing floating magnets 48 to pass rapidly through coil 26, thereby generating an electric current in coil 26. When ring magnet 33 is used, magnets 48 will oscillate axially in amplitudes decreasing to zero as magnets 48 return to their starting position as shown in FIG. 7. Output from the coil may then be rectified and used or stored in a battery for later use according to the circuit shown in FIG. 5. Exemplary uses of the harvested energy from the device shown in FIGS. 6-9 may be to recharge a battery, or to power a solenoid, coil, piezo or motor actuator of an electric door release, or to power any type of peripheral electronic devices such as electronic keypads, alarms, transmitters, receivers or illuminating devices.

Figure 11:
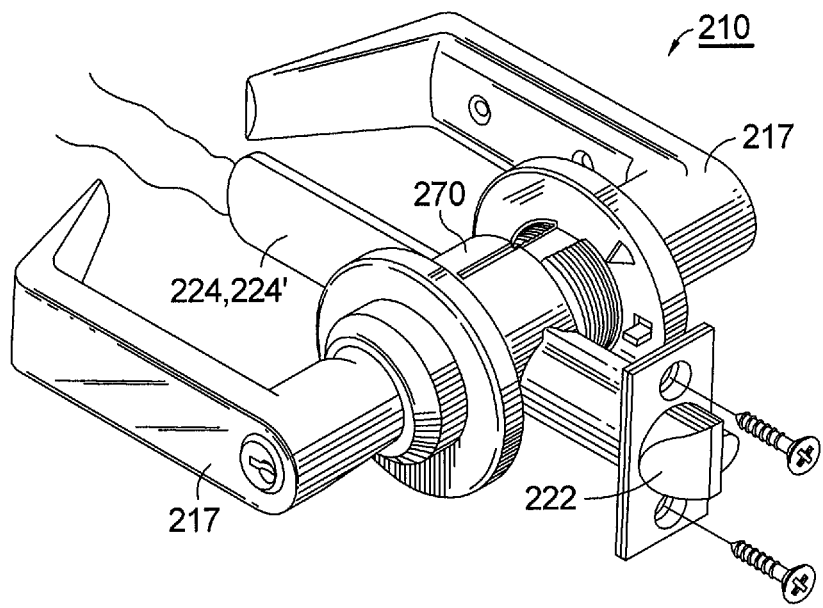
FIG. 11 is an isometric view of a door latch bolt system including an EMEH in accordance with the present invention.

Referring to FIG. 11, a second exemplary embodiment of a door actuator 210 is shown. Actuator 210 harvests the motion of a latch bolt 222 that is mechanically moved axially inward by a knob or handle 217. For bore-in type locks, the space for EMEH 224,224' may be provided by a deeper hole drilled in the edge of the door. EMEH 224,224', similar in action to EMEH 24,24' is attached to the opposite end of lock set 270 powered by handle motion. While the energy harvester may be depressed at a relatively low speed as the handle is turned to release the door, once the handle is released, release of the energy harvester actuator and floating magnets happens at a relatively high speed. Note that, with the embodiment shown in FIG. 11, the actuator within EMEH 224,224' is reciprocated twice for each door opening and closing cycle. The first reciprocation of the actuator occurs when knob/handle 217 is turned to retract bolt 222, then released while the door is open. The second complete reciprocation of the actuator occurs when the door closes and the latch bolt is retracted by its engagement with the strike plate and then quickly released to its extended position inside the strike plate.

Exemplary uses of the harvested energy from the device shown in FIG. 11 may be to recharge a battery, or to power a solenoid, coil, piezo actuator or motor within the door latching mechanism, or to power other peripheral electronic devices such as, for example, electronic keypads, alarms, transmitters, receivers or illuminating devices. Note also that, since the energy harvester can be self-contained in the door itself, the EMEH shown in FIG. 11 can be used to recharge a battery or power electrical devices mounted in or on the door without the need for running a wiring circuit from a door frame to a movable door.

While ring magnet 33 has been described as a singular ring magnet, it is understood that ring magnet 33 may be comprised of a plurality of ring magnets stacked axially to produce the desirable strength and polarity.

Obviously, there are many other applications wherein waste kinetic energy from similar reciprocal motion may be harvested by EMEH 24,24' especially when such motion is potentially faster in one direction than the other. All such applications are fully comprehended by the present invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An electromagnetic energy harvester, comprising:
   a) a coil including a wire winding having a central section, said central section defining an energy converter, said coil including a first end and a second end opposite said first end;
   b) at least one floating permanent magnet slidably disposed within said energy converter defined by said central section and having a first pole;
   c) at least one fixed permanent magnet disposed at said first end of said coil and having a second pole oriented such that said second pole repels said first pole;
   d) an actuator disposed in cooperation with said at least one floating magnet, said actuator defining a receiver of outside input energy force; and
   e) a ring magnet fixedly disposed at said second end of said coil.

2. An electromagnetic energy harvester in accordance with claim 1 wherein said at least one floating permanent magnet has a third pole opposite in polarity of said first pole and wherein said ring magnet has a fourth pole oriented such that said fourth pole attracts said third pole.

3. An electromagnetic energy harvester in accordance with claim 1 comprising a plurality of said at least one fixed permanent magnets.

4. An electromagnetic energy harvester in accordance with claim 1 comprising a plurality of said at least one floating permanent magnets.

5. An electromagnetic energy harvester in accordance with claim 1 wherein said winding defines first and second electrical lead ends and wherein said electromagnetic energy harvester further comprises a battery connected to said electric lead ends through a bridge rectifier.

6. An electromagnetic energy harvester in accordance with claim 5 further comprising a voltage rectifying circuit disposed between said coil and said battery.

7. An electromagnetic energy harvester in accordance with claim 1 wherein said wire winding is disposed about a bobbin and said at least one floating permanent magnet is slidably disposed within said bobbin.

8. A door latch activating mechanism, comprising:
 a) first and second interacting mechanical components, wherein said first component is in motion during operation of said door latch activating mechanism; and
 b) an electromagnetic energy harvester cooperative with said first component to harvest kinetic energy from said motion of said first component.

9. A door latch activating mechanism in accordance with claim 8 wherein said first component is a keeper.

10. A door latch activating mechanism, comprising:
 a) a retractable latch bolt; and
 b) an electromagnetic energy harvester having an actuator cooperative with said retractable latch bolt during retraction and extension thereof.

11. A method for harvesting kinetic energy as electric energy, comprising the steps of:
 a) providing a coil of electrically conductive wire;
 b) providing at least one first magnet slidably disposed within said coil of electrically conductive wire, wherein said at least one first magnet has a first magnetic orientation;
 c) providing at least one second magnet proximate a first end of said coil of electrically conductive wire, wherein said at least one second magnet has a second magnetic orientation such that said first magnet is repelled by said second magnet;
 d) providing at least one third magnet proximate a second end of said coil of electrically conductive wire, wherein said at least one third magnet has a third magnetic orientation such that said first magnet is attracted to said third magnet;
 e) urging said at least one first magnet toward said at least one second magnet to increase magnetic repulsion therebetween; and
 f) urging said at least one first magnet by said repulsion away from said at least one second magnet toward said third magnet to generate electric current by passage of said at least one first magnet through said coil of electrically conductive wire.

12. A method in accordance with claim 11 wherein said urging toward step also produces an electric current in said coil of electrically conductive wire.

13. A method in accordance with claim 11 wherein the velocity of said at least one first magnet is greater in said urging away step than in said urging toward step.

14. A method in accordance with claim 11 further comprising the steps of:
 a) providing an opening in said at least one third magnet;
 b) providing a non-magnetic plunger extending through said opening; and
 c) engaging said plunger with said at least one first magnet during said urging toward step.

15. A method in accordance with claim 14 further comprising the step of applying an axial force to said plunger during said urging toward step.

16. The method claim in accordance with claim 11 wherein said at least one third magnet is fixedly positioned.

17. The method claim in accordance with claim 11 comprising the further step of providing a braking effect on said at least one first magnet as said at least one first magnet approaches said at least one third magnet.

18. The method claim in accordance with claim 17 wherein said at least one third magnet is a ring magnet configured for providing said braking effect.

19. An electromagnetic energy harvester, comprising:
 a) a coil including a wire winding having a central section, said central section defining an energy converter, said coil including a first end and a second end opposite said first end;
 b) at least one floating permanent magnet slidably disposed within said energy converter defined by said central section and having a first pole;
 c) at least one fixed permanent magnet disposed at said first end of said coil and having a second pole oriented such that said second pole repels said first pole;
 d) an actuator disposed in cooperation with said at least one floating magnet, said actuator defining a receiver of outside input energy force; and
 e) a ferromagnetic plate disposed at said second end of said coil.

20. An electromagnetic energy harvester in accordance with claim 19 wherein said ferromagnetic plate attracts said at least one floating permanent magnet.

21. An electromagnetic energy harvester in accordance with claim 19 wherein said ferromagnetic plate is fixedly positioned.

22. An electromagnetic energy harvester, comprising:
 a) a coil including a wire winding having a central section, said central section defining an energy converter, said coil including a first end and a second end opposite said first end;
 b) at least one floating permanent magnet slidably disposed within said energy converter defined by said central section and having a first pole;
 c) at least one fixed permanent magnet disposed at said first end of said coil and having a second pole oriented such that said second pole repels said first pole;
 d) an actuator disposed in cooperation with said at least one floating magnet, said actuator defining a receiver of outside input energy force; and
 e) a ring magnet disposed at said second end of said coil, wherein said at least one floating permanent magnet has a third pole opposite in polarity of said first pole and wherein said ring magnet has a fourth pole oriented such that said fourth pole attracts said third pole.

\* \* \* \* \*